March 4, 1969 H. SIEGEL 3,431,364

ANNOYANCE CALL TRAP

Filed July 9, 1965

United States Patent Office 3,431,364
Patented Mar. 4, 1969

3,431,364
ANNOYANCE CALL TRAP

Herbert Siegel, Munchingen, Germany, assignor to International Standard Electric Corporation, New York, N.Y., a corporation of Delaware Filed July 9, 1965, Ser. No. 470,787
Claims priority, application Germany, July 14, 1964, St 22,400
U.S. Cl. 179—18 8 Claims
Int. Cl. H04m 3/00

ABSTRACT OF THE DISCLOSURE

A centrally controlled telephone switching system is provided with at least one special link having equipment for identifying calling lines in order to trap annoyance calls. Called lines receiving such annoyance calls are identified by a translator associated with the common controls. When such an identification is found, the call is rerouted through the special link.

Figure 1:
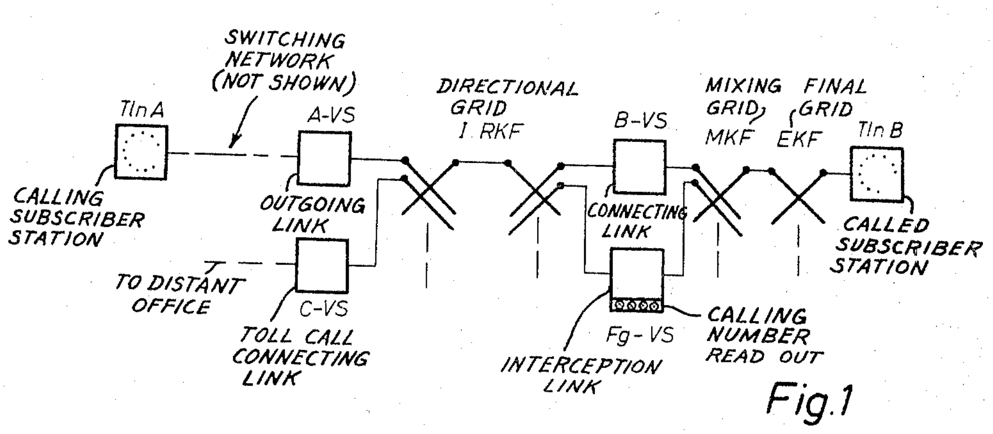

The invention relates to an arrangement for intercepting a connection in telecommunication, generally and more particularly to trapping annoyance telephone exchange systems having centralized control facilities.

It is sometimes necessary to intercept an established connection, in order to identify the calling person, as for example to trap anonymous callers making annoyance calls.

In directly controlled dialling systems, the calling subscriber is identified by a backward tracing of the intercepted connection. The signal to make an intercepting identification is furnished by the final selector or by any other suitable facility. The person who traces the call is informed by the signal that the called subscriber wishes to identify the calling subscriber. For example, a particular control signal may be given by grounding one of the wires associated with the call being intercepted, in order to prevent a release of the connection to the calling subscriber circuit. The connection remains established, even if the calling subscriber has restored his handset.

To authorize a subscriber to request an operating telephone company to intercept a connection, a known practice is to route all calls to such subscriber through special intercepting final selectors. In a group of one hundred subscribers, about eight to fifteen final selectors are required. Therefore, it is expensive to associate a subscriber with intercepting authorization final selectors, because each subscriber with such an intercepting facility must be re-equipped on an equal number (eight to fifteen) of final selectors.

Another known method of intercepting a connection provides a mobile intercepting facility which contains a number of selectors—the output of which must be connected with all final selector inputs of a hundred-line group. This type of intercepting facility identifies the final selector that is used to establish the connection. The necessary interception authorization signals are transmitted from the connected mobile intercepting facility to the corresponding final selector. Such a method of intercepting connections is as uneconomical as the above-mentioned ones known to the art. If several subscribers of different hundred-line groups request such an interception service, several such mobile intercepting facilities must be provided.

In all cases authorization of interception requires a considerable expense in switching or replacement work in the system. Moreover, the tracing of the intercepted connection is very time consuming, because in some cases it is necessary to make a quick identification of the calling person as well as the station.

It is an object of the invention to provide for the interception of connections in telecommunication generally, more particularly in telephone exchange systems with central control facilities. Another object is to provide equipment which is simple in construction and in which each subscriber can be authorized to use the intercepting facility without requiring major changes in existing connections.

According to the invention, an identification translator provides a signal which designates any called subscriber station authorized to request interception of an annoyance call. Depending on the absence or presence of this translator signal, a connection is made to the calling subscriber station by the control facility, acting through either a normal connecting link or an intercepting link. By using the identification translator, a simple reversing signal is provided. The connection is then rerouted, if required, to the intercepting link, which acts as a separate connecting link. Through simple jumper connections within the identification translator, each called subscriber can be authorized to intercept a call. The rerouting can be made, depending on the authorization. Only a small number of intercepting links are required because there are only a few simultaneously called subscribers who are authorized to intercept the call. In many cases, one or two intercepting links per system would be sufficient. In an exchange there are also calls where the connection does not need to be intercepted, even if a subscriber is called who is authorized to intercept said call.

According to the invention, a terminating toll connection is not rerouted over the intercepting link.

According to further embodiments of the invention in systems with subscriber identification facilities the calling subscriber is identified either before ringing a subscriber who wants the call to be intercepted, or when a subscriber has answered an incoming call or by a switching function performed by the called subscriber. Under any of these conditions, the call number of the calling subscriber is investigated, stored, and fed into an indicating or read out facility. In a system with several control groups, each control group has at least one associated intercepting link.

A circuit arrangement to carry out the invention is characterized in this that, after storing the number dialled, the central control device actuates the identification translator, and that the authorization signal changes the control information for the switching network in such a way that, instead of seizing a normal link for terminating traffic, the intercepting link is seized for the connection.

The intercepting link and the normal links are connected into the network of the system for terminating traffic in the same manner. But the intercepting link can only be incorporated in the connecting route leading to the called subscriber responsive to a receipt of a special signal. These special signals are obtained, when the actuated identification translator furnishes the signal, marking an authorization to intercept the call. Another circuit arrangement to carry out the invention provides that the subscriber circuit is led via the intercepting link, and that the thus formed intercepting link can be inserted directly into the connection via an extended directional grid.

Figure 2:
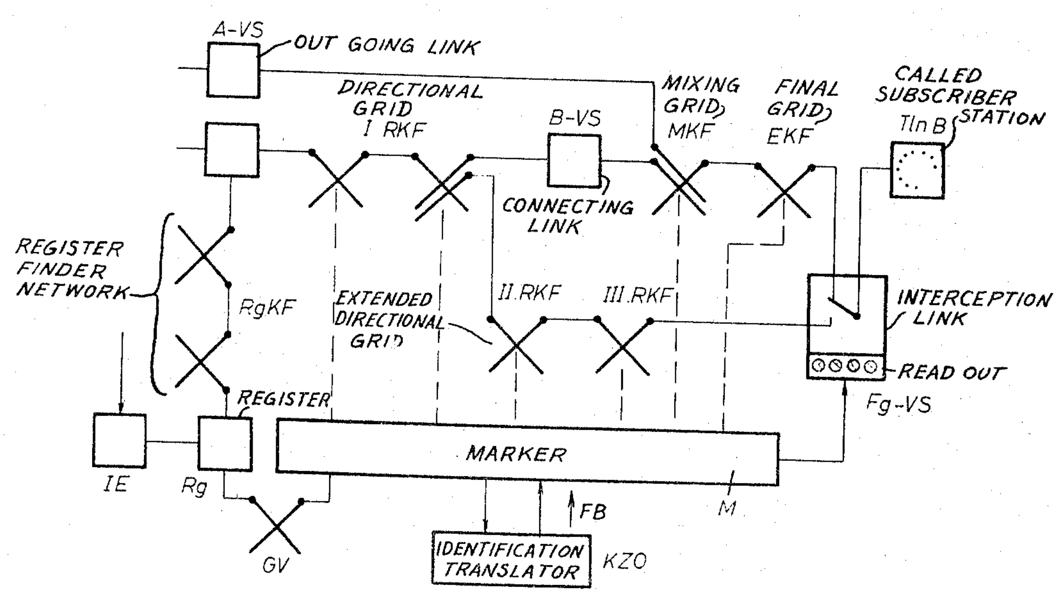

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 shows a functional block diagram of a centrally controlled telephone exchange with permanently associated intercepting links, and FIG. 2 shows the insertion of intercepting links into the subscriber circuit.

In FIG. 1, the calling subscriber station T*ln*A is connected with the link A–VS for outgoing traffic through a switching grid, not shown on the drawing.

As may be gathered from FIG. 2, the link is connected with the register R*g* through the register finder grid R*g*KF. The register R*g* receives the dial pulse information and furnishes that information to the marker M of the destination group to which the called subscriber T*ln*B belongs. The register sends the dial pulses via a group link GV.

The marker M actuates the identification translator KZO. The translator returns the intercepting authorization responsive to the dial information inserted into the translator, if the number of the called subscriber so indicates. This authorization is here described as an intercepting signal FB. The connection with the subscriber T*ln*B, authorized to intercept the call, is now made under control of the marker M. This connection is extended via an intercepting link F*g*–VS which contains all switching means which are necessary in order to intercept the connection and to identify the calling subscriber. This connection is made via the first directional grid I.RKF and the mixing grid and final grid MKF and EKF. The signal FB which indicates an authorization to intercept a call causes the marker M to change a setting of the dialled in information. This change selects the output of the directional grid I.RKF leading to the input of the intercepting link F*g*–VS and the input of the grid MKF connected with the output of the link F*g*–VS. It can be gathered therefrom that the intercepting link is substituted for a connecting link B–VS, which is used for terminating traffic into the network of the system during normal calls.

Only when the signal FB, of the identification translator KZO, appears in the intercepting link is used for establishing a call to a called subscriber T*ln*B who is authorized to intercept the caller. The identification translation KZO offers the possibility of very quickly changing the authorization of interception of the subscriber. There is no necessity of replacing major connections or switching equipment. If the system has several control groups with separate markers associated therewith, each control group is equipped with an intercepting link. At a connection between subscribers in two different control groups the marker of the destination group controls the identification translator and, consequently, actuates the intercepting link of said group.

When a toll call arrives, another connecting link is seized as indicated by the link C–VS. In such a call, an interception does not make sense because the preceding exchange cannot easily trace the connection to a calling line. Therefore, it is desirable to suppress the rerouting over the intercepting link F*g*–VS when a subscriber, authorized to intercept the caller, is called. To so suppress the call, a signal may be derived in a most simple manner from the seized link C–VS since this link is associated with a definite trunk line, arriving from another exchange or from a toll dialling signal. For example, the signal is furnished by the appropriate register during its readout of the dialling information.

FIG. 2 shows an alternative embodiment for inserting the intercepting link F*g*–VS into a connection. The subscriber line circuit of the called subscriber, authorized to intercept the caller, is looped through the intercepting link F*g*–VS. Thus, intercept service is given to all calls to the subscriber, authorized to intercept the caller.

Calling and speaking possibilities are always provided.

Inserting the intercepting link in the connection is controlled by the marker M, acting responsive to the intercepting signal FB, furnished by the identification translator KZO.

For outgoing traffic, the connection between the link A–VS is made through an extended directional grid I.RKF, II.RKF, and III.RKF directly to the called subscriber via the intercepting link F*g*–VS. Thus one intercepting link F*g*–VS can be used for several control groups.

It should still be mentioned that the intercepting link used according to the invention can perform all the functions of the intercepting facilities known to the art, as for example, to intercept the connection, after the called subscriber, authorized to intercept the caller, has emitted a signal, as by dialling a predetermined digit.

While the principles of the invention have been described above in connection with specific apparatus and applications, it is to be understood that this description is made only by way of example and not as a limitation on the scope of the invention.

What is claimed is:

1. An annoyance call trap for use in a commonly controlled telephone system comprising a plurality of switching links for extending normal call connections from a calling line to a called line, a translator for identifying the location of equipment serving called lines to said common control equipment means in said translator for identifying the called stations which are authorized to demand the services of said annoyance call trap, means comprising a special switch link which is directly substitutable for at least one of said switching links, said special link including means for identifying calling lines, and means responsive to said translator for selectively rerouting a call via said special switching link.

2. The call trap of claim 1 and means for selectively precluding said rerouting of said call.

3. The call trap of claim 1 and means responsive to said translator for identifying said calling line prior to said rerouting.

4. The call trap for claim 1 and means responsive to said translator for identifying said calling line when said call is answered to said called station.

5. The call trap of claim 1 and means responsive to the receipt of a digit dialled at said called station for identifying said calling line.

6. The call trap of claim 1 and means for reading out the calling number of the identified line.

7. The call trap of claim 1 wherein there are a plurality of separately controlled switching networks, and said rerouting means comprises at least one of said special switching links associated with each of said separate controls.

8. The system of claim 1 and means including a marker associated with said common controls for receiving dial pulses, means responsive to receipt of said dial pulses in said marker for seizing said translator and forwarding said dial pulses thereto, means in said translator responsive to the receipt of said forwarded dial pulses for returning a signal to said marker for indicating said called line authorized to demand said identification, and means responsive to said returned signal for altering said dial pulses in said marker in order to reroute the call.

References Cited

UNITED STATES PATENTS 3,143,601 8/1964 Joel ------------ 179—27.12

WILLIAM C. COOPER, *Primary Examiner.*

A. H. GESS, *Assistant Examiner.*